US010050531B1

(12) United States Patent
Zhang et al.

(10) Patent No.: US 10,050,531 B1
(45) Date of Patent: Aug. 14, 2018

(54) DIRECT FLUX CONTROL POWER CONVERTER

(71) Applicant: General Electric Company, Schenectady, NY (US)

(72) Inventors: Di Zhang, Niskayuna, NY (US); Ruxi Wang, Cohoes, NY (US); Satish Prabhakaran, Albany, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/414,300

(22) Filed: Jan. 24, 2017

(51) Int. Cl.
*H02M 3/158* (2006.01)
*H02M 1/12* (2006.01)

(52) U.S. Cl.
CPC ........... *H02M 3/158* (2013.01); *H02M 1/126* (2013.01)

(58) Field of Classification Search
CPC . H02M 3/155–3/158; G05F 1/44; G05F 1/58; G05F 3/135
USPC ............... 323/265, 271, 273, 282–285, 351; 363/65
See application file for complete search history.

(56) References Cited

U.S. PATENT DOCUMENTS

| | | | |
|---|---|---|---|
| 3,958,173 A | 5/1976 | Christianson et al. | |
| 4,328,458 A | 5/1982 | Hiromitsu | |
| 5,245,525 A | 9/1993 | Galloway et al. | |
| 5,390,102 A | 2/1995 | Araki | |
| 5,703,767 A | 12/1997 | Stacey | |
| 5,852,554 A | 12/1998 | Yamamoto | |
| 6,788,033 B2 * | 9/2004 | Vinciarelli | H02M 3/1582 323/225 |
| 8,829,872 B1 * | 9/2014 | Pierson | H02M 1/14 323/272 |
| 8,860,255 B2 | 10/2014 | Jones et al. | |
| 9,748,841 B2 * | 8/2017 | Granato | H02M 3/158 |
| 2008/0219032 A1 * | 9/2008 | Stancu | H02M 3/156 363/21.01 |
| 2011/0002445 A1 | 1/2011 | Hattrup et al. | |
| 2012/0025791 A1 * | 2/2012 | Abu Qahouq | H02M 3/156 323/271 |
| 2012/0074949 A1 | 3/2012 | Kepley et al. | |

(Continued)

FOREIGN PATENT DOCUMENTS

WO 2011083788 A1 7/2011

OTHER PUBLICATIONS

Miyairi, Shota, et al.; "New Method for Reducing Harmonics Involved in Input and Output of Rectifier with Interphase Transformer", Industry Applications, IEEE Transactions on, vol. IA-22 , Issue:5, pp. 790-797, Sep. 1986.

(Continued)

*Primary Examiner* — Adolf Berhane
(74) *Attorney, Agent, or Firm* — GE Global Patent Operation; Nitin Joshi

(57) ABSTRACT

Systems and methods related to controlling flux through an inductor of a power converter are described. For example, a control system is configured to control a multi-level converter having a first leg, a second leg, and at least one inductor. The control system includes a processor operatively coupled to a memory. The processor receives a reference signal. The processor determine flux through at least one inductor of a converter. The processor controls a temporal distribution of the flux through the at least one inductor based on the flux through the at least one inductor according to the reference signal.

17 Claims, 5 Drawing Sheets

(56) References Cited

U.S. PATENT DOCUMENTS

2016/0072312 A1* 3/2016 Ichikawa ............ H02M 3/1582
307/104
2016/0329811 A1 11/2016 Du et al.
2017/0310205 A1* 10/2017 Coleman ................ H02M 1/15

OTHER PUBLICATIONS

Bhide, R.S., et al.;"Analysis of parallel operation of converters with interphase transformer", Power Electronics, 2006. IICPE 2006. India International Conference on, pp. 193-196, Dec. 19-21, 2006, Chennai.

Sankala, A., et al.;"Flux and winding current balancing control for a medium-frequency six-winding transformer", Industrial Electronics Society, IECON 2014—40th Annual Conference of the IEEE, pp. 1473-1479, Oct. 29, 2014-Nov. 1, 2014, Dallas, TX.

EP Search Report and Opinion issued in connection with corresponding EP Application 18151700.4 dated May 16, 2018.

* cited by examiner

US 10,050,531 B1

DIRECT FLUX CONTROL POWER CONVERTER

BACKGROUND

The subject matter disclosed herein relates to power converters, and more particularly, to a control system of a power converter that reduces a peak flux experienced by an inductor.

Power converters are generally used in power systems to convert power from one form to another suitable form of power for a load, such as motors, electronics, or appliances. Some power converter systems may include two or more levels (e.g., in parallel), each of which output a voltage. Each level of these multi-level converters may include circuit elements, such as capacitors, switches, inductors, and the like, to provide power to the load.

However, to provide power at certain levels, components of the multi-level inverters may encompass additional space within a facility. For example, as the rated power output of a multi-level converter increases, the size and weight of an output inductor for the multi-level converter also increases. Depending on the application, the increased size and/or weight due to the output inductor may reduce efficiency of the power system.

BRIEF DESCRIPTION

In one embodiment, a system includes power conversion circuitry including a first leg configured to receive a direct current (DC) voltage from a DC bus, a second leg configured to receive the DC voltage from the DC bus, wherein the first leg and the second leg are configured to output power to a load, at least one inductor configured to filter the power output by the power conversion circuitry, and a controller configured to receive a reference signal, and control a first set of switches of the first leg and a second set of switches of the second leg to provide the power to the load based on the reference signal, wherein the first set of switches and second set of switches are operated to limit a flux received via the at least one inductor.

In a second embodiment, a method includes receiving, at a controller, a reference signal, controlling switches of a first leg and switches of a second leg of a converter to output a positive voltage until a ripple current of power conversion circuitry of the converter reaches a ripple current limit, controlling the switches of the first leg to output a positive voltage and the switches of the second leg to output a negative voltage such that an average voltage of the power provided to the load is zero until the flux reaches a flux limit, the ripple current reaches the ripple current limit, or both, and controlling the switches of the first leg to output a negative voltage and the switches of the second leg to output a positive voltage such that an average voltage of the power provided to the load is zero until the flux reaches the flux limit, the ripple current reaches the ripple current limit, or both.

In a third embodiment, a control system is configured to control a multi-level converter having a first leg, a second leg, and at least one inductor, the control system including a processor operatively coupled to a memory, wherein the processor is configured to receive a reference signal, determine flux through at least one inductor of a converter, and control a temporal distribution of the flux through at least one inductor based on the flux through at least one inductor according to the reference signal.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present disclosure are directed to systems and methods to reduce a peak magnetic flux within an inductor (e.g., interphase inductor) of multi-level converters. A multi-level converter may include a number of switches for each leg of the converter. The output of each leg of the multi-level converter may be coupled to one or more inductors. In some embodiments, the multi-level converter may have each leg coupled to an interphase inductor that filters the output voltage signal of the respective leg. The size of the interphase inductor depends on the peak flux that the inductor is designed to withstand. Peak flux may refer to a maximum magnetic flux through the inductor during power conversion or operation of the converter system. The inductor may be selected such that a core of the inductor withstands some maximum magnetic flux. Moreover, the inductor may prevent an inrush of current to the load due to saturation of the core. By reducing the peak magnetic flux experienced by the interphase inductor, a smaller and/or lighter interphase inductor may be used by the converter system, thereby improving the power density of the converter system.

To reduce the peak flux, the converter system may include a controller that controls operation of the switches on each leg of the converter. In one embodiment, the controller may receive a reference signal indicating a desired power output of the converter system. The controller may then receive a sensor signal indicating a voltage across the interphase inductor. The controller may further determine current ripple based on a difference (e.g., voltage-second error) between the reference signal and a power output of the converter. The controller may then determine a flux through the interphase inductor based on the voltage across the interphase inductor. The controller may control operation of the converter to limit the peak flux within the inductor and the current ripple output by the converter. By limiting the flux and the current output ripple, a smaller and/or lighter interphase inductor may be used, thereby improving power density of the converter system.

Figure 1:
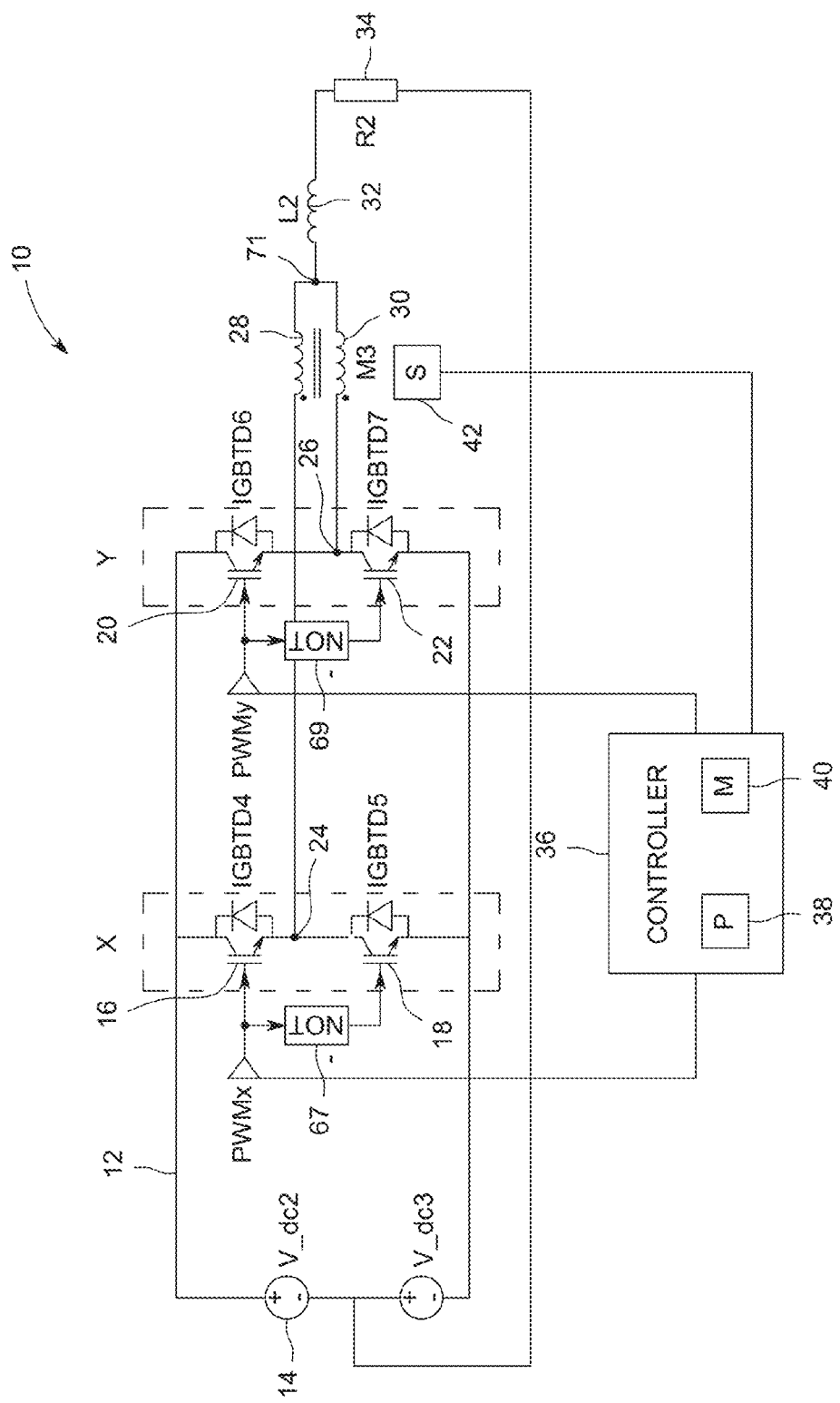
FIG. 1 is a schematic diagram of a converter system and a controller that controls a peak flux in a core of an inductor in the converter system, in accordance with an embodiment.

With the preceding introductory comments in mind, FIG. 1 shows a schematic diagram of a converter system 10. In the illustrated embodiment, the converter system 10 is a multi-level converter that has a first phase leg X and a second phase leg Y, the second phase leg Y being in parallel with the first phase leg X. Although two legs are shown in parallel, this is meant to be illustrative and any suitable number of legs (e.g., 3, 4, 5, or more) may be used in any suitable arrangement. The legs X and Y are coupled to a DC bus 12 that receives power from one or more DC sources 14. The DC source 14 may be any suitable source, such as a battery, a power supply, or the like.

In the illustrated embodiment, the first phase leg X includes two switches 16 and 18, and the second phase leg Y includes two switches 20 and 22. The switches 16, 18, 20, and 22 may be insulated-gate bipolar transistors (IGBTs), metal-oxide semiconductor field-effect transistors (MOSFETs), or any other suitable switch that opens and/or closes to control power delivered to the load 34. The switches 16 and 18 of the first phase legs X may be electrically connected on an output 24. The switches 20 and 22 of the second phase leg Y may be electrically connected to an output 26. As such, legs X and Y of the converter system 10 form two levels at which power can be delivered from the switches 16, 18, 20, and 22. For example, the first switch 16 and the second switch 18 of the first phase leg X may be switched opened and closed at a first frequency to output a first voltage, and the first switch 16 and the second switch 18 of the leg X may be switched opened and closed at a second frequency to output a second voltage at a different level than the first voltage. The second leg Y may operate in a similar manner to leg X to output different voltages.

The outputs 24 and 26 of the legs X and Y, respectively, may be coupled to one or more inductors 28, 30, and 32 that filter the harmonics of a voltage signal delivered from the outputs 24 and 26 to the load 34. In the illustrated embodiment, the converter system 10 includes interphase inductors 28 and 30 corresponding to each of the legs X and Y. The core size of each of the inductors 28, 30, and 32 may be selected based on an expected peak flux of a respective magnetic core. That is, the core size of the inductors 28, 30, and 32 is directly proportional to the peak flux that the inductor may sustain. As described below, to reduce the weight and/or size of the interphase inductor 28 and 30, a controller 36 of the converter system 10 may control the operation of the switches 16, 18, 20, and 22, such that the peak flux within the inductors 28, 30 is reduced.

The controller 36 may include a processor 38 and a memory 40. While a single processor 38 will be used throughout this disclosure, as one of ordinary skill in the art will appreciate, multiple processors 38 may be used by the controller 36. The processor 38 may be operatively coupled to the memory 40 to execute instructions for carrying out the presently disclosed techniques. These instructions may be encoded in programs or code stored in a tangible non-transitory computer-readable medium, such as the memory 40 and/or other storage. The processor 38 may be a general purpose processor, system-on-chip (SoC) device, application-specific integrated circuit, or some other processor configuration. The memory 40, in the embodiment, includes a computer readable medium, such as, without limitation, a hard disk drive, a solid state drive, a diskette, a flash drive, a compact disc, a digital video disc, random access memory (RAM), read-only memory (ROM), electrically erasable programmable read-only memory (EEPROM), and/or any suitable storage device that enables the processor 38 to store, retrieve, and/or execute instructions and/or data.

The processor 38 may send signals to gates of the switches 16, 18, 20, and 22 to open or close the switches 16, 18, 20, and 22 at certain frequencies to control power delivered to the load 34. For example, the processor 38 may perform pulse width modulation (PWM) in which pulses are delivered to the gates of switches 16, 18, 20, and 22 based on a reference signal compared to a waveform (e.g., triangle waveform), such that the average voltage output by the converter system 10 corresponds to the reference signal. In some embodiments, the processor 38 may receive signals from sensor(s) indicating a voltage across the interphase inductors 28 and 30. For instance, the processor 38 may receive a signal indicating a voltage across one or more of the interphase inductors 28 and 30 via a sensor 42. The processor 38 may determine flux through the interphase inductors 28 and 30 based on a relationship between the measured voltage of the inductors 28 and 30 over time. In other embodiments, the processor 38 may determine the flux based on the PWM signals provided to the switches 16, 18, 20, and 22.

Figure 2:
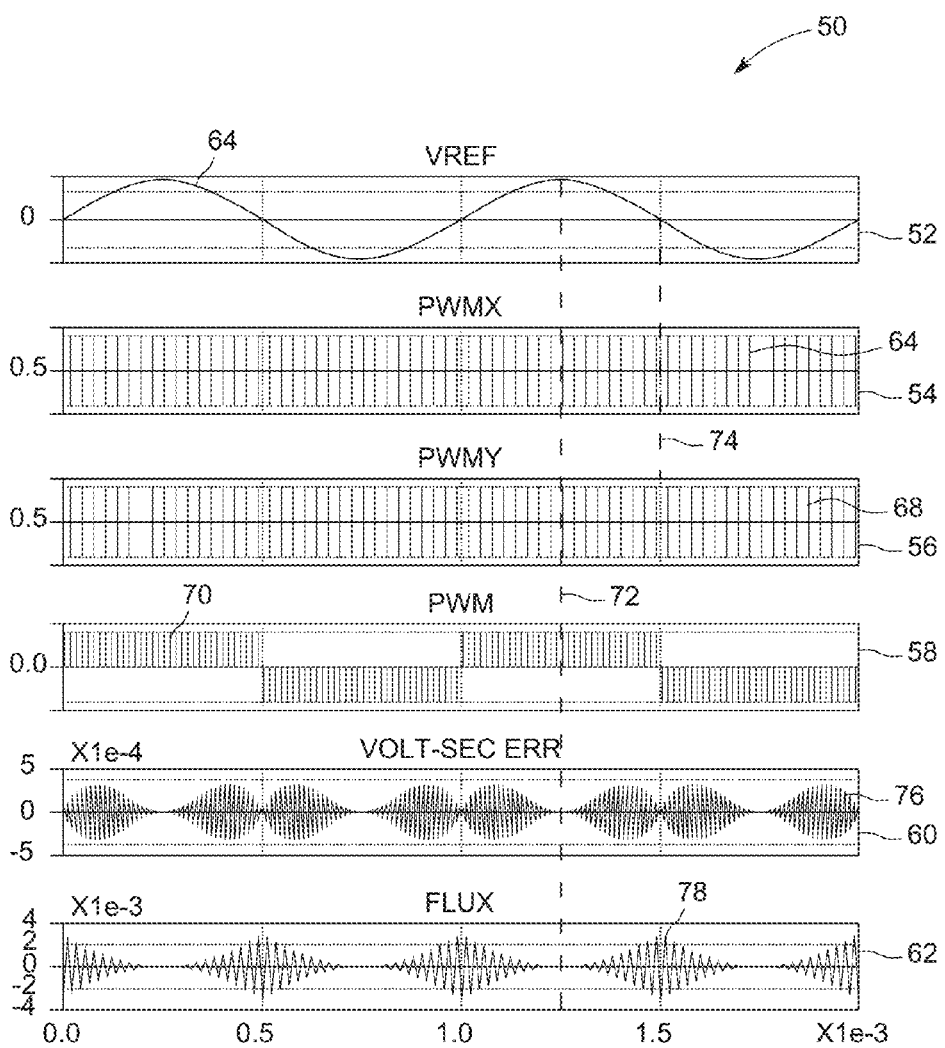
FIG. 2 is a set of graphs of characteristics of the converter system being controlled by the controller of FIG. 1 based on a reference voltage, in accordance with an embodiment.

FIG. 2 is a set 50 of graphs 52, 54, 56, 58, 60, and 62 that show signals from the converter system 10 to deliver power to the load 34 without accounting for the flux. While the process is described with respect to the graphs, this is meant to be illustrative, and the processor 38 may perform the steps described below without generating the graphs shown. Each of the graphs 52, 54, 56, 58, 60, and 62 are aligned with respect to time.

In one embodiment, the processor 38 receives a reference signal 64 as shown in graph 52. The reference signal 64 may be a sine wave, triangle wave, or any other suitable waveform that the converter system 10 is capable of outputting. As an example, the processor 38 may generate a first triangle waveform, compare the reference signal 64 to the first triangle waveform, and output a signal 66 (e.g., PWM signal of leg X) having pulses of a width based on the comparison. Similarly, the processor 38 may compare the reference signal 64 to a second triangle waveform, phase shifted (e.g., interleaved) by half a switching cycle from the first triangle waveform, and output a second signal 68 (e.g., PWM signal of phase leg Y) based on the comparison. While half a switching cycle is used here as an example, the phase shifting may depend upon the number of legs of the converter system 10. While an example of PWM waveforms is described above, any suitable method of generating a PWM waveform may be used. The processor 38 may generate the output signal 66 to control the switch 16 of the first phase leg X, and control switch 18 of leg X based on an opposite signal through a not gate 67 (FIG. 1). Similarly, the processor 38 may generate the output signal 68 to control the switch 20 of the second phase leg Y and control switch 22 of leg Y based on an opposite signal through not gate 69 (FIG. 1). Further, the voltage at outputs 24 and 26 may correspond to the output of PWM X and PWM Y. By controlling the switches 16 and 18 to output the signal 66 at output 24 and controlling the switches 20 and 22 to output the signal 68 at output 26, each of the legs X and Y may generate voltages of the combined PWM waveform 70 at the combined point 71 (FIG. 1) with respect to ground. The PWM waveform 70 is a combination of the PWM X and PWM Y waveforms (e.g., graphs 54 and 56) that approximate the reference signal 64. As shown in FIG. 2, the PWM waveform 70 includes pulses at time 72 that correspond to the reference signal 64 peaks, such that the pulses at time 72 have a width longer than other pulses (e.g., pulses near time 74). Conversely, the PWM waveform 70 includes pulses that are switched on approximately half the time and off approximately half the time at the zero of the reference signal 64 to approximate an average output of zero.

A difference between the PWM waveform 70 and the reference signal 64 may be referred to as a voltage-second error. The difference may be related to ripple currents of the PWM waveform 70. In one embodiment, the processor 38 may determine the voltage-second error by comparing the reference signal 64 to the PWM waveform 70. Graph 60 includes a voltage-second error waveform 76 indicating the difference between the reference signal 64 and the PWM waveform 70 due to the ripple current. Shown in graphs 58 and 60, as switching frequency increases, the ripple current increases. In many applications, it is desirable to reduce voltage-second error because it corresponds to the total harmonic distortion (THD) of the waveform 70.

Graph 62 shows the flux of the interphase inductors 28 and 30 due to the PWM waveform 70. The flux through the interphase inductors 28 and 30 may be related to voltage such that:

$$\Phi = \int V dt \qquad \text{Equation (1)}$$

where $\Phi$ is the magnetic flux through the interphase inductors 28 and 30, and V is a voltage across the interphase inductors 28 and 30 integrated with respect to time. With respect to the converter system 10, the flux may be related to the PWM waveform 70 such that:

$$\Phi = \int (V_{PWM\ X} - V_{PWM\ Y}) dt \qquad \text{Equation (2)}$$

where $V_{PWM\ X}$ is the voltage signal output by leg X during respective pulses and the $V_{PWM\ Y}$ corresponds to voltage signals output by leg Y pulses. That is, the flux through the interphase inductors 28 and 30 may be the difference between the voltage signals 66 and 68 of the PWM waveforms integrated with respect to time. For example, the flux is lower at points when the voltage of the reference signal 64 or output of the converter system 10 is outputting a relatively high value (e.g. at time 72). The flux is at a peak 78 at points in which the PWM X and PWM Y are outputting different values (e.g., PWM X is high while PWM Y is low and vice versa). PWM X and PWM Y tend to be at different values and switch more frequently to output values at approximately zero. The inductors 28, 30, and 32 may include cores that are designed to withstand the peak value so that the inductors 28, 30, and 32 do not saturate, allowing an inrush of current through the inductors 28, 30, and 32. Because the sizes of cores of the interphase inductors 28 and 30 are selected based on the magnitude of the peak flux and because the size of the interphase inductors 28 and 30 is directly related to the sizes of the respective cores, it is desirable to reduce the peak 78 of the flux to reduce the size and/or weight of the core of the interphase inductors 28 and 30, thereby reducing the size and/or weight and improving power density of the converter system 10.

Figure 3:
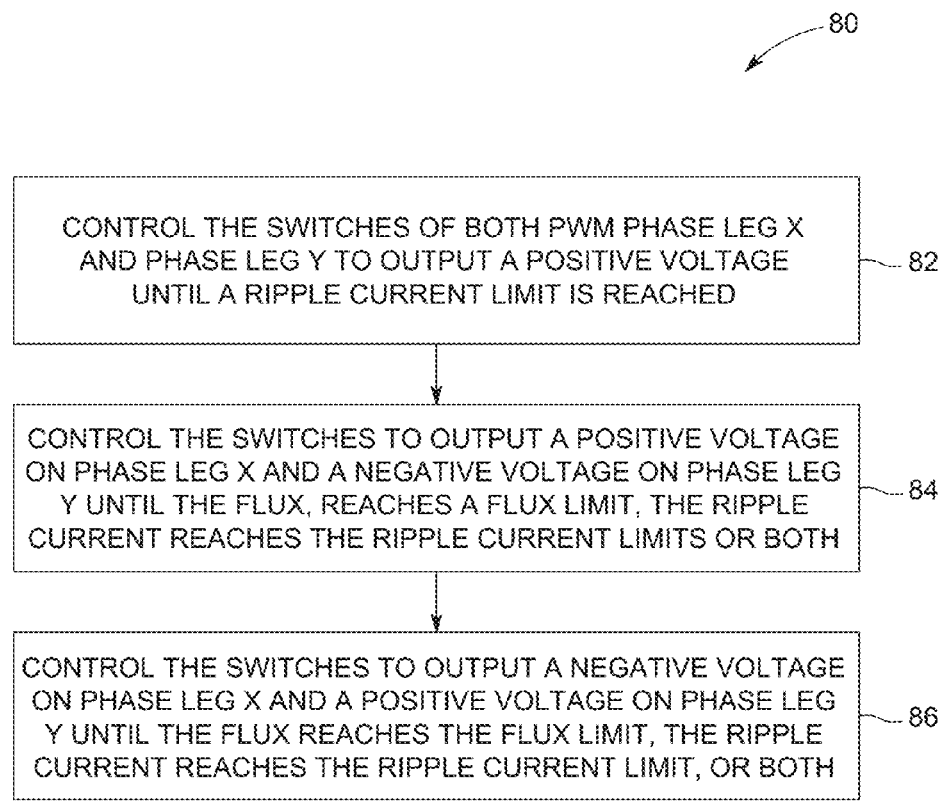
FIG. 3 is a process performed by the controller of FIG. 1 to reduce the peak flux of the inductor, in accordance with an embodiment.

FIG. 3 shows a flow chart of a process 80 performed by the processor 38 that limits the flux through the interphase inductors 28 and 30 and limits the ripple current of the power output. The process 80 may be stored in the memory 40 of the converter system 10 and executed as instructions (e.g., code) by the processor 38. The processor 38 may receive a reference signal 104 (FIG. 5) indicating a desired output of the converter system 10. In some embodiments, the processor 38 may receive a signal from the sensor 42 (e.g., voltage sensor) indicating the voltage across at least one of the inductors 28, 30, and 32 to determine the flux. The processor 38 may also determine a ripple current due to a integration of the difference (e.g., voltage-second error) between the PWM and the reference signal. The processor 38 may then control output of the converter according to the reference signal in a manner that limits the flux to a threshold value and in a manner that limits the ripple current to a threshold value. To control the output of the converter system 10, the process 80 may be performed by the processor 38 to limit the flux and the ripple current.

As explained below with respect to FIG. 3, while the voltage of the reference signal 104 is positive, the processor 38 may control the switches 16, 18, 20, and 22 to output a positive voltage at both phase leg X and phase Y. In this case the flux in the interphase inductor will remain constant and the output ripple current will increase. The processor 38 may also control the switches 16, 18, 20 and 22 to output a positive voltage at phase leg X and a negative voltage at phase leg Y. In this case, the flux in the interphase inductor will increase and the ripple current will decrease. The processor 38 may also control the switches 16, 18, 20 and 22 to output a negative voltage at phase leg X and a positive voltage at phase leg Y. In this case, the flux in the interphase inductor and the ripple current will both decrease. That is, by controlling operation of the switches 16, 18, 20, and 22, the processor 38 may control the flux and the ripple current.

Similarly, as explained below with respect to FIG. 4, while the voltage of the reference signal 104 is negative, the processor 38 may control the switches 16, 18, 20, and 22 to output a negative voltage at phase leg X and phase Y. In this case the flux in the interphase inductor will remain constant and the ripple current will increase. The processor 38 may also control the switches 16, 18, 20 and 22 to output a positive voltage at phase leg X and a negative voltage at phase leg Y. In this case, the flux in the interphase inductor will increase and the ripple current will decrease. The processor 38 may control the switches 16, 18, 20 and 22 to output a negative voltage at phase leg X and a positive voltage at phase leg Y. In this case, the flux in the interphase inductor and the ripple current will both decrease. The processor will control the converter in different states when the flux through the interphase inductors 28 and 30 reaches a flux limit 118, the ripple current reaches the ripple current limit 120, or both.

Referring to FIG. 3 at block 82, when the voltage of the reference signal 104 (FIG. 5) is positive, both phase legs X and Y output a positive voltage until a ripple current limit 120 (e.g., voltage-second error limit) of a difference between the reference signal 104 and the combined PWM signal 110 of PWM X signal 106 and PWM Y signal 108 is reached. Because there is no difference in voltages of the PWM X signal 106 and the PWM Y signal 108, the flux generated within the interphase inductors 28 and 30 is zero.

At block 84, The processor will switch the converter to a different state when the flux through the interphase inductors 28 and 30 reaches a flux limit 118, the ripple current reaches the ripple current limit 120, or both. Referring briefly to the graphs depicted in FIG. 5, at time 116, the processor 38 limits the flux to the flux limit 118 by changing the PWM X signal 106 to negative and the PWM Y signal 108 to positive, thereby reversing the direction of the slope of the flux (e.g., from increasing to decreasing or decreasing to increasing). Further, if the flux limit 118 has not been reached, the processor 38 may limit the ripple current to a ripple current limit 120, as described above.

At block 86, after the flux reaches the flux limit 118 or the ripple current reaches the ripple current limit 120 as described above with reference to block 84, the processor 38 may control the switches 16, 18, 20, and 22 to output a negative voltage on phase leg X and a positive voltage on phase leg Y until the flux reaches a flux limit 118, the ripple current reaches the ripple current limit 120, or both of an opposite sign as the flux limit 118 or the ripple current limit 120 of block 84. The flux limit 118 and the ripple current limit 120 may be any suitable limit and may depend on the characteristics (e.g., size, magnetic properties) of the interphase inductors 28 and 30. During periods in which the voltage or voltages of the power output are at or near zero, the flux increases or decreases due to the difference in voltages of the PWM signals 106 and 108.

Figure 4:
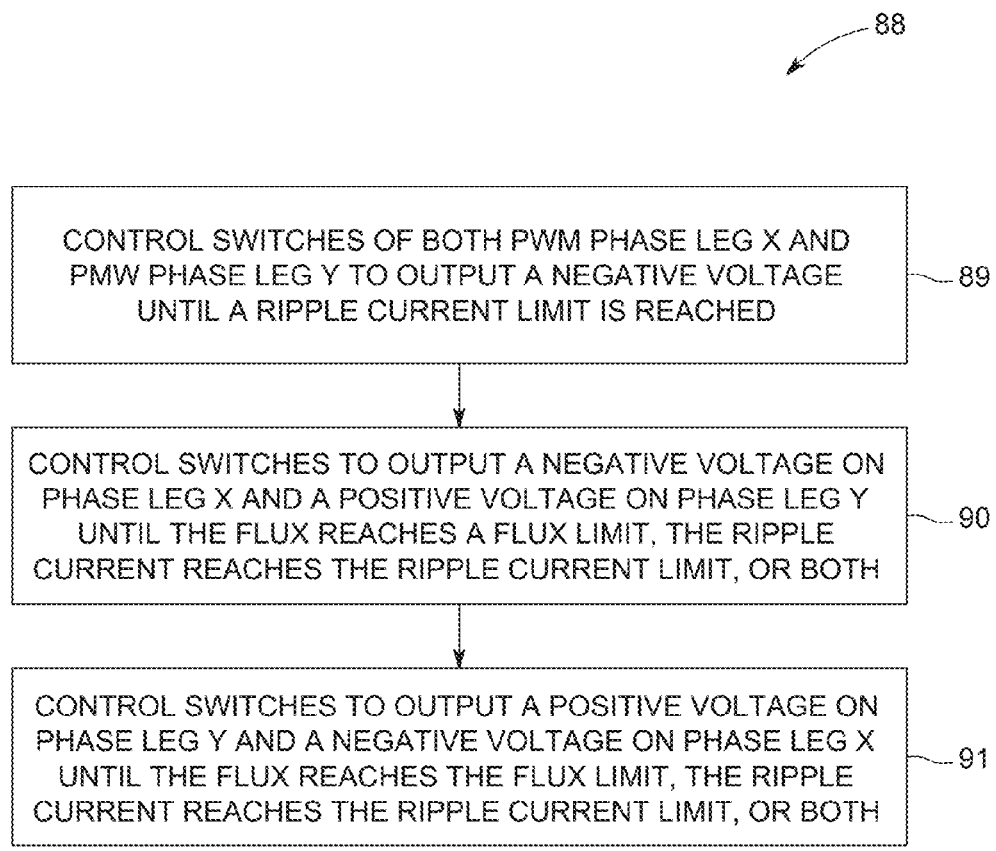
FIG. 4 is another process performed by the controller of FIG. 1 to reduce the peak flux of the inductor, in accordance with an embodiment.

FIG. 4 is a flow chart of a process 88 that may be performed by the processor 38 while the reference signal 104 is negative. That is, the process 88 includes blocks 89, 90, and 91 that are similar to the steps performed by the processor 38 while the reference signal is positive, described above with reference to the process 80 of FIG. 3.

Figure 5:
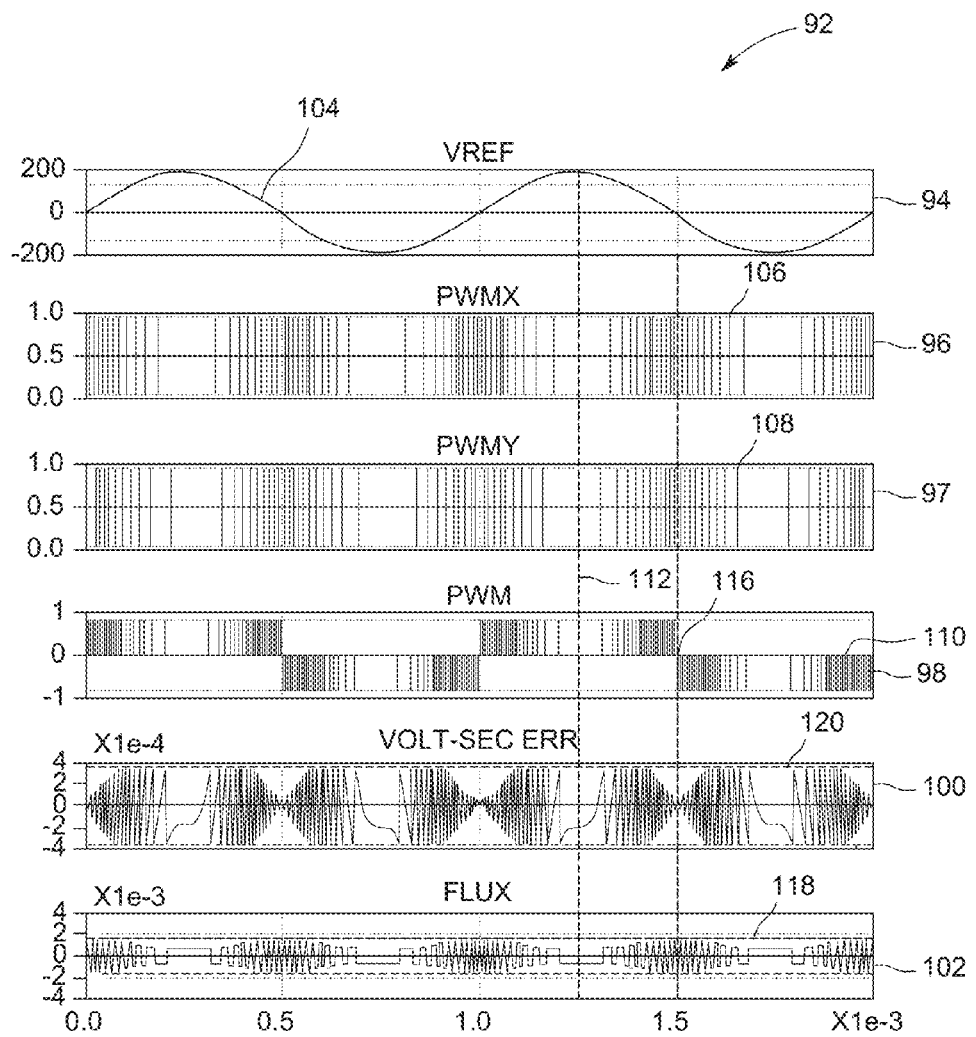
FIG. 5 is a set of graphs of characteristics of the converter system being controlled by the controller of FIG. 1 to reduce the peak flux of the inductor in the converter system, in accordance with an embodiment.

FIG. 5 is a set 92 of graphs 94, 96, 97, 98, 100, and 102 that show signals of the converter system 10 to deliver power to the load such that the flux through the interphase inductors 28 and 30 is temporally distributed throughout the waveform to reduce the peak value. While the process is described with respect to the graphs, this is meant to be illustrative, and the processor 38 may perform the steps described below without generating the graphs shown. Each of the graphs 94, 96, 97, 98, 100, and 102 are aligned with respect to time. The processor 38 receives a reference signal 104 as shown in graph 94. The reference signal 104 may be a sine wave, triangle wave, or any other suitable waveform. The processor 38 may control the switches such that the flux is temporally distributed with a reduced peak flux value. Further, the processor 38 may switch the switches faster at times where the reference signal 104 is near zero due to the ripple current and switch the switches slower at times where the reference signal 104 is near peak values, as reflected at time 112, such that the average switching frequency is approximately the same as performed in the methods described which operate without accounting for the flux through the interphase inductors 28 and 30.

That is, the methods that account for the flux (e.g. the method described through the process 80 of FIG. 3) may reduce the peak value of the flux while an average switching frequency is approximately the same as the average switching frequency without accounting for the flux (e.g. the method described through the set 50 of FIG. 2) and the approximately the same voltage-second error (and therefore the total harmonic distortion).

As shown in FIG. 5, by controlling the switches 16, 18, 20, and 22 based on the flux limit 118 and the ripple current limit 120, a peak flux and/or a peak ripple current through the interphase inductors 28 and 30 may be limited (e.g., to the flux limit 118 and/or the ripple current limit 120) as compared to a controller that controls the switches 16, 18, 20, and 22 without the flux limit 118 and/or the ripple current limit 120 (as described with respect to FIG. 2). For example, the flux limit 118 of FIG. 5 reduces the peak flux through the interphase inductor 28 and 30 by controlling the direction of the slope of the flux through the inductor 28 and 30.

If each of the phase legs X and Y outputs a positive voltage, the final output voltage is positive. Further, from equation (2), because there is no difference between PWM X and PWM Y, the flux does not increase because the voltage across the inductor is zero. At time 112, there is no difference in voltages of the PWM X signal 106 and the PWM Y signal 108 causing the flux to be zero. Similarly, if each phase leg outputs a negative voltage, the final output voltage is negative and the flux does not increase because the voltage across the inductor is zero. At time 116, the difference in voltages between the PWM X being positive and the PWM Y being negative causes the flux to increase. Similarly, if the PWM X is negative and the PWM Y is positive, the voltage of the inductor causes the flux to decrease. As such, the frequency at which the switches of the phase leg X and phase leg Y are switched may be higher at the periods in which the reference signal 104 is near zero (as compared to time 74) to limit the flux to the flux limit 118, as shown at time 116, and the switches may be switched at a slower frequency (as compared to time 72) while the reference signal 104 is near a maximum due to the low flux values, as shown at time 112. In the illustrated embodiment, the processor 38 controls the switches based on the flux at time 116 and controls the switches based on the ripple current at time 112 to both limit the ripple and the flux such that smaller inductors may be used without increasing THD.

Technical effects of the invention include a converter with a controller that controls switches based on flux and/or ripple current. The controller receives a reference signal. The controller controls switches of the converter to output a waveform that approximates the reference signal while limiting the flux and the ripple current to certain limits. By limiting the flux and/or the ripple current, the converter may have smaller inductors than converters that do not limit the flux and/or ripple current.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
  power conversion circuitry comprising:
    a first leg configured to receive a direct current (DC) voltage from a DC bus;
    a second leg configured to receive the DC voltage from the DC bus, wherein the first leg and the second leg are configured to produce a power output to a load;
    at least one inductor configured to filter the power output by the power conversion circuitry; and
  a controller configured to:
    receive a reference signal; and
    control a first set of switches of the first leg and a second set of switches of the second leg to provide the power output to the load based on the reference signal, wherein the first set of switches and second set of switches are operated to limit a flux received via the at least one inductor;
  wherein the controller is configured to:
    control the first set of switches and the second set of switches to cause the power conversion circuitry to output a positive voltage until a ripple current of the power conversion circuitry reaches a ripple limit;
    control the first set of switches to cause the first leg to output a positive voltage and the first set of switches to cause the second leg to output a negative voltage, thereby causing the power conversion circuitry to output a first average voltage of zero until the flux reaches a flux limit, the ripple current reaches the ripple current limit, or both; and control the first set of switches to cause the first leg to output a negative voltage and the second set of switches to cause the second leg to output a positive voltage, thereby causing the power conversion circuitry to output a second average voltage of zero until the flux reaches the flux limit, the ripple current reaches the ripple current limit, or both.

2. The system of claim 1, wherein the controller is configured to control the power output provided to the load based on a ripple current associated with the power output by the power conversion circuitry.

3. The system of claim 1, wherein the controller is configured to control a temporal distribution of the flux to reduce a peak value of the flux.

4. The system of claim 1, wherein the at least one inductor comprises a first interphase inductor electrically coupled to the first leg and a second interphase inductor electrically coupled to the second leg.

5. The system of claim 1, wherein the controller is configured to determine the flux by integrating a difference between a first pulse width modulation (PWM) signal associated with the first leg and a second PWM signal associated with the second leg.

6. The system of claim 1, wherein the controller is configured to control the first set of switches to cause a slope of the flux to change direction when a flux limit is reached.

7. The system of claim 1, comprising a first output coupled between a first switch of the first set of switches and a second switch of the second set of second switches, wherein the output is coupled to a first inductor of the at least one inductor.

8. The system of claim 7, comprising a second output coupled between a third switch of the first set of switches and a fourth switch of the second set of switches, wherein the second output coupled to a second inductor of the at least one inductor.

9. A method, comprising:
receiving, at a controller, a reference signal;
controlling switches of a first leg and switches of a second leg of a converter to output a positive voltage until a ripple current of power conversion circuitry of the converter reaches a ripple current limit;
controlling the switches of the first leg to output a positive voltage and the switches the second leg to output a negative voltage such that an average voltage of power provided to the load is zero until the flux reaches a flux limit, the ripple current reaches the ripple current limit, or both;
controlling the switches of the first leg to output a negative voltage and the switches of the second leg to output a positive voltage such that an average voltage of the power provided to the load is zero until the flux reaches the flux limit, the ripple current reaches the ripple current limit, or both; and
determining the flux through the inductor by calculating the flux based on $\Phi=\int(PWM\ X-PWM\ Y)dt$ where $\Phi$ is the magnetic flux of the at least one inductor, PWM X is a pulse width modulation signal of a first leg of the converter, and PWM Y is a pulse width modulation signal of a second leg of the converter.

10. The method of claim 7, comprising controlling a temporal distribution of the flux to reduce a peak value of the flux.

11. The method of claim 7, comprising determining the flux through the inductor by calculating the flux based on a measured voltage across the inductor.

12. A control system configured to control a multi-level converter having a first leg, a second leg, and at least one inductor, comprising:
a processor operatively coupled to a memory, wherein the processor is configured to:
receive a reference signal;
determine flux through at least one inductor of a converter;
control a temporal distribution of the flux through the at least one inductor based on the flux through the at least one inductor according to the reference signal; and
wherein the controller is configured to:
control switches of the first leg and switches of the second leg to output a positive voltage until a ripple current of the multi-level converter reaches a ripple current limit;
control switches of the first leg to output a positive voltage and switches of the second leg to output a negative voltage to output an average value of zero until the flux reaches a flux limit, the ripple current reaches the ripple current limit, or both; and
control switches of the first leg to output a negative voltage and switches of the second leg to output a positive voltage to output an average value of zero until the flux reaches the flux limit, the ripple current reaches the ripple current limit, or both.

13. The control system of claim 12, wherein the processor is configured to control the power provided to the load based on ripple current.

14. The control system of claim 12, wherein the processor is configured compare the flux to a flux limit.

15. The control system of claim 12, wherein the at least one inductor comprises a first interphase inductor electrically coupled to the first leg and a second interphase inductor electrically coupled to the second leg.

16. The control system of claim 12, wherein the processor is configured to determine the flux by integrating a difference between a pulse width modulation (PWM) signal of the first leg and a PWM signal of the second leg.

17. The control system of claim 12, wherein the processor is configured to control the switches to change direction of the slope of the flux when the flux limit is reached.

* * * * *